(12) United States Patent
Morita et al.

(10) Patent No.: US 11,660,527 B2
(45) Date of Patent: May 30, 2023

(54) INPUT DEVICE

(71) Applicant: Sony Interactive Entertainment Inc., Tokyo (JP)

(72) Inventors: Masaho Morita, Tokyo (JP); Taichi Nokuo, Tokyo (JP)

(73) Assignee: Sony Interactive Entertainment Inc., Tokyo (JP)

( * ) Notice: Subject to any disclaimer, the term of this patent is extended or adjusted under 35 U.S.C. 154(b) by 135 days.

(21) Appl. No.: 17/058,373

(22) PCT Filed: Jun. 20, 2019

(86) PCT No.: PCT/JP2019/024581
§ 371 (c)(1),
(2) Date: Nov. 24, 2020

(87) PCT Pub. No.: WO2019/244995
PCT Pub. Date: Dec. 26, 2019

(65) Prior Publication Data
US 2021/0197081 A1    Jul. 1, 2021

(30) Foreign Application Priority Data

Jun. 21, 2018 (JP) .............................. JP2018-117877

(51) Int. Cl.
*A63F 13/24* (2014.01)
*A63F 13/218* (2014.01)

(52) U.S. Cl.
CPC ............ *A63F 13/24* (2014.09); *A63F 13/218* (2014.09)

(58) Field of Classification Search
CPC .... A63F 13/24; A63F 13/218; A63F 2300/10; A63F 2300/30
(Continued)

(56) References Cited

U.S. PATENT DOCUMENTS 6,752,719 B2   6/2004  Himoto
8,870,654 B2  10/2014  Nakayama
(Continued)

FOREIGN PATENT DOCUMENTS

JP    2001029658 A    2/2001
JP    3108313 U       4/2005
(Continued)

OTHER PUBLICATIONS

International Search Report for corresponding PCT Application No. PCT/JP2019/024581, 3 pages, dated Jul. 30, 2019.
(Continued)

*Primary Examiner* — Allen Chan
(74) *Attorney, Agent, or Firm* — Matthew B. Dernier, Esq.

(57) ABSTRACT

An input device that enables various operations is proposed. A plurality of operating buttons (11) and direction keys (12) are arranged in an upper surface (17g). Lower surface buttons (31R, 31L) are arranged in a lower surface (17a). The lower surface buttons (31R, 31L) project downward from the lower surface (17a), have pressing target surfaces (31a) to be pressed by a finger of a user, and are arranged such that the pressing target surfaces (31a) are inclined with respect to a front edge (10a) of the input device (1). The lower surface buttons (31R, 31L) can be moved when the pressing target surfaces (31a) are pressed in a button rearward direction as a direction along the lower surface (17a).

13 Claims, 7 Drawing Sheets

(58) Field of Classification Search
USPC .......................................................... 463/37
See application file for complete search history.

(56) References Cited

U.S. PATENT DOCUMENTS

| | | | |
|---|---|---|---|
| 9,289,688 B2 | 3/2016 | Burgess | |
| 9,878,238 B2* | 1/2018 | Burgess | .................... A63F 9/24 |
| 10,286,304 B2 | 5/2019 | Russell | |
| 2002/0098887 A1 | 7/2002 | Himoto | |
| 2006/0040740 A1* | 2/2006 | DiDato | ................... A63F 13/22 |
| | | | 463/7 |
| 2013/0178293 A1 | 7/2013 | Nakayama | |
| 2013/0281212 A1 | 10/2013 | Tsuchiya et al. | |
| 2015/0238855 A1* | 8/2015 | Uy | .......................... A63F 13/24 |
| | | | 463/37 |
| 2015/0360126 A1 | 12/2015 | Burgess | |
| 2016/0256772 A1 | 9/2016 | Kissoon | |
| 2016/0317918 A1 | 11/2016 | Gassoway | |
| 2016/0325177 A1 | 11/2016 | Antonio | |
| 2017/0348596 A1 | 7/2017 | Igarashi | |
| 2018/0056180 A1 | 3/2018 | Russell | |
| 2018/0185748 A1* | 7/2018 | Biheller | .................. A63F 13/24 |
| 2018/0207523 A1* | 7/2018 | Lyden | .................... A63F 13/214 |

FOREIGN PATENT DOCUMENTS

| | | |
|---|---|---|
| JP | 2013236909 A | 11/2013 |
| JP | 2015506012 A | 2/2015 |
| JP | 6060416 B2 | 1/2017 |
| JP | 2017511240 A | 4/2017 |
| WO | 2018044658 A1 | 3/2018 |

OTHER PUBLICATIONS

Notice of Reasons for Refusal for corresponding JP Application No. 2020-525802, 10 pages, dated Aug. 11, 2021.
Extended European Search Report for corresponding EP Application No. 19822358, 9 pages, dated Feb. 15, 2022.
International Preliminary Report on Patentability and Written Opinion for corresponding PCT Application No. PCT/JP2019/024581, 17 pages, dated Dec. 30, 2020.

* cited by examiner

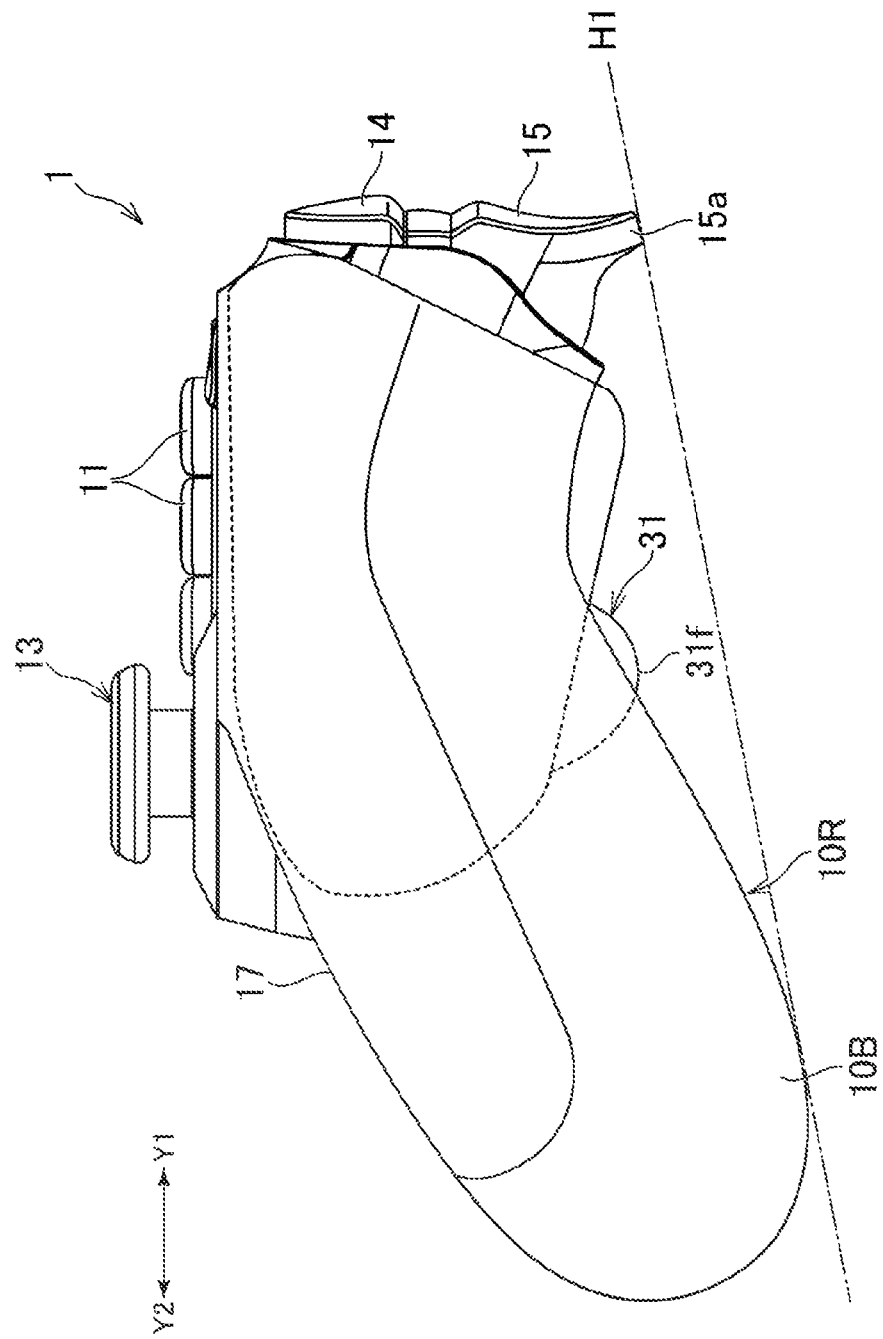

INPUT DEVICE

TECHNICAL FIELD

The present invention relates to an input device.

BACKGROUND ART

Some input devices used to operate a game device have a plurality of operating members such as sticks, buttons, and direction keys. An input device of PCT Patent Publication No. WO 2014/061362 has a right grip and a left grip, and such operating members are arranged in an upper surface and a front surface of a front portion of each grip.

SUMMARY

Recently, with improvements in processing performance of game devices, diversification of movement of game characters has become possible. Accordingly, an input device of a game device may be desired to enable various operations.

An example of an input device proposed in the present disclosure includes: a first operating member disposed in an upper surface; and a second operating member disposed in a lower surface. The second operating member projects downward from the lower surface. The second operating member has a pressing target surface to be pressed by a finger of a user, and is disposed such that the pressing target surface is inclined with respect to an extending direction of a front edge of the input device. The second operating member can be moved when the pressing target surface is pressed in a first direction as a direction along the lower surface. With the input device, the existence of the second operating member enables more various operations than conventional. In addition, the orientation of the pressing target surface can be matched with movement of the finger of the user. As a result, the user can operate the second operating member smoothly.

BRIEF DESCRIPTION OF DRAWINGS

FIG. 7 is a side view of the input device.

DESCRIPTION OF EMBODIMENT

An input device proposed in the present disclosure will hereinafter be described. In the following, an input device 1 illustrated in FIG. 1 and the like will be described as an example. In the following description, directions indicated by Y1 and Y2 in FIG. 1 will be referred to as a forward direction and a rearward direction, respectively, and directions indicated by Z1 and Z2 in FIG. 1 will be referred to as an upward direction and a downward direction, respectively. In addition, directions indicated by X1 and X2 illustrated in FIG. 2 will be referred to as a right direction and a left direction, respectively.

General Outline

The input device 1 is, for example, used to operate a game device. The input device 1 can communicate with the game device in a wired or wireless manner, and transmits a signal corresponding to an operation performed on the input device 1 (button operation or the like) to the game device. The game device controls a game on the basis of the signal received from the input device 1. The input device 1 may be used as an input device for an information processing device different from the game device.

Figure 1:
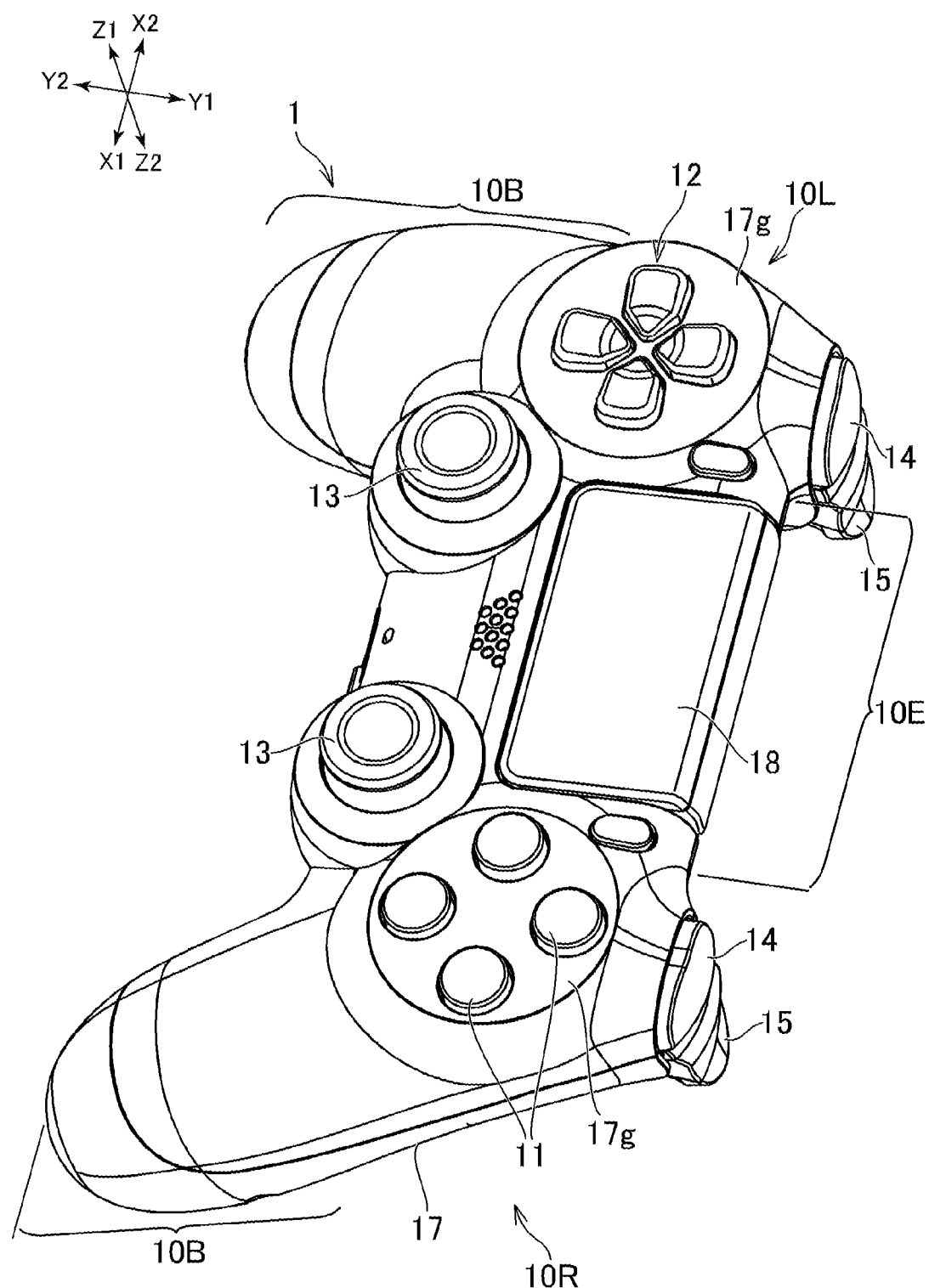
FIG. 1 is a perspective view illustrating an example of an input device as an embodiment of the present invention.

As illustrated in FIG. 1, the input device 1 includes a right portion 10R and a left portion 10L. Operating members are arranged on a front side region of an upper surface of the right portion 10R and a front side region of an upper surface of the left portion 10L. Specifically, a plurality of operating buttons 11 (specifically, four operating buttons 11) are arranged on the upper surface of the right portion 10R. The four operating buttons 11 are arranged at end portions of a cross shape. In addition, direction keys 12 that can be tilted in a radial direction or slid in the radial direction are disposed on the upper surface of the left portion 10L. In addition, the input device 1 includes operating sticks 13 located between the right portion 10R and the left portion 10L. The operating sticks 13 allow operations of tilting the operating sticks 13 in a radial direction thereof and operations of depressing the operating sticks 13. The input device 1 includes an operating pad 18 located between the operating buttons 11 and the direction keys 12. The operating pad 18 includes a touch sensor. The input device 1 includes a central portion 10E located between a front portion of the right portion 10R and a front portion of the left portion 10L. The operating pad 18 is disposed in the central portion 10E. Operating buttons 14 and 15 aligned with each other in an upward-downward direction are arranged on a front surface of the right portion 10R. Similarly, operating buttons 14 and 15 aligned with each other in the upward-downward direction are arranged on a front surface of the left portion 10L. The kinds and arrangement of the operating members and the shape of the input device are not limited to those of the example of the input device 1.

The right portion 10R and the left portion 10L each have a grip portion 10B. The grip portion 10B is located in the rear of a region provided with operating members such as the operating buttons 11, the direction keys 12, or the like (horizontal region). In the example of the input device 1, the grip portion 10B extends rearward of a rear edge of the central portion 10E. The shape of the input device is not limited to the example represented by the input device 1. For example, the grip portion 10B may not extend rearward of the rear edge of the central portion 10E.

As illustrated in FIG. 1, the input device 1 includes a housing 17 constituting an exterior of the input device 1. The above-described plurality of operating members (the operating buttons 11, 14, and 15, the operating sticks 13, and the direction keys 12) are arranged in openings formed in the housing 17. A circuit board 52 (see FIG. 3) mounted with a control circuit for controlling the input device 1 and the like is disposed within the housing 17. In the example of the input device 1, the housing 17 is bilaterally symmetric with respect to a center line C1 of the input device 1 in a left-right direction. The shape of the housing 17 may not be bilaterally symmetric unlike the example of the input device 1.

[Lower Surface Button]

Figure 2:
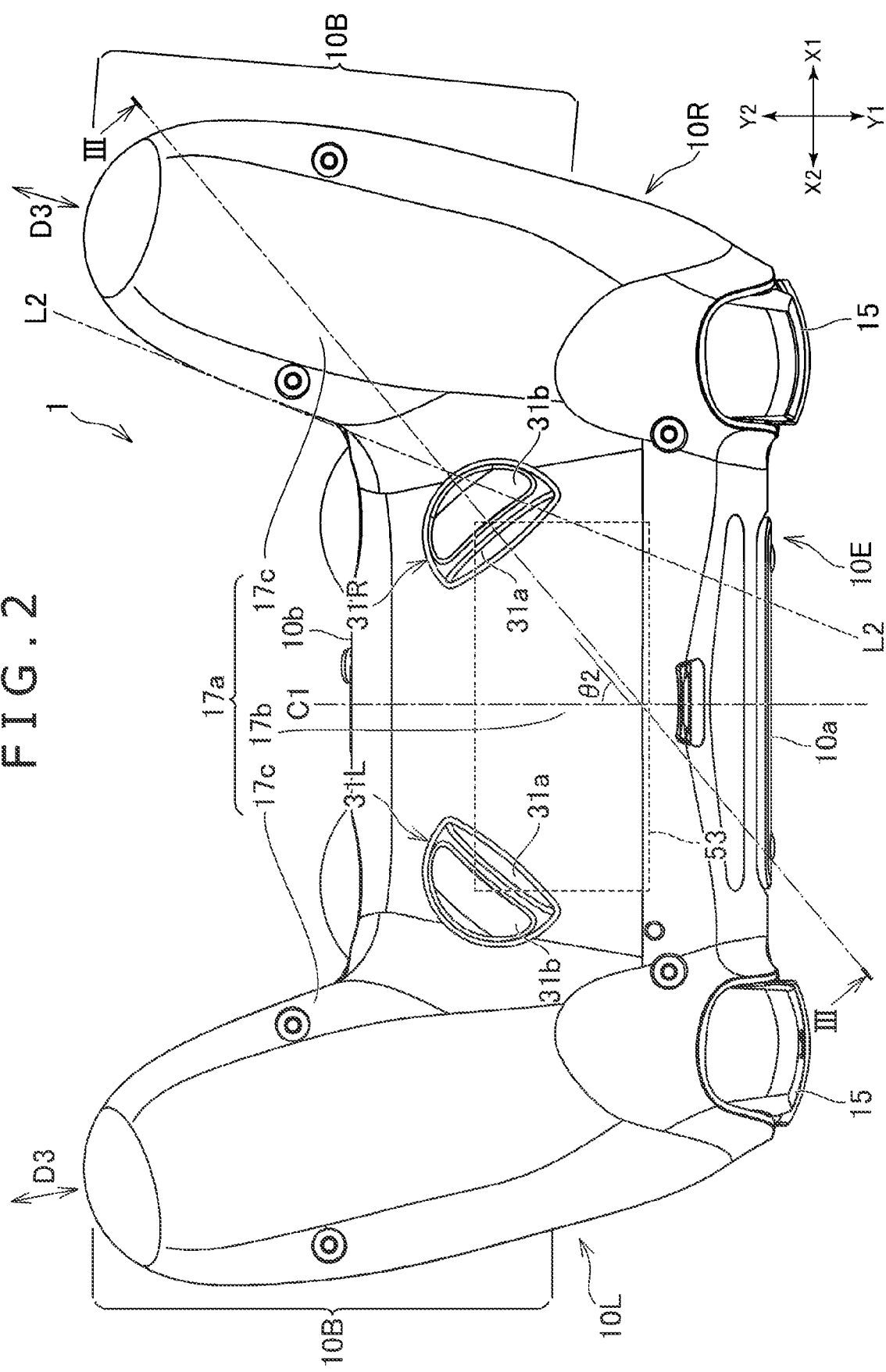
FIG. 2 is a bottom view of the input device.

As illustrated in FIG. 2, operating buttons 31R and 31L are provided to a lower surface 17a of the input device 1. In the example of the input device 1, a right side operating button 31R and a left side operating button 31L are provided to the lower surface 17a. In the following, the operating buttons 31R and 31L will be referred to as "lower surface buttons." In addition, in description common to both of the two lower surface buttons 31R and 31L, a reference sign 31 is used for both of the two lower surface buttons 31R and 31L.

Figure 3:
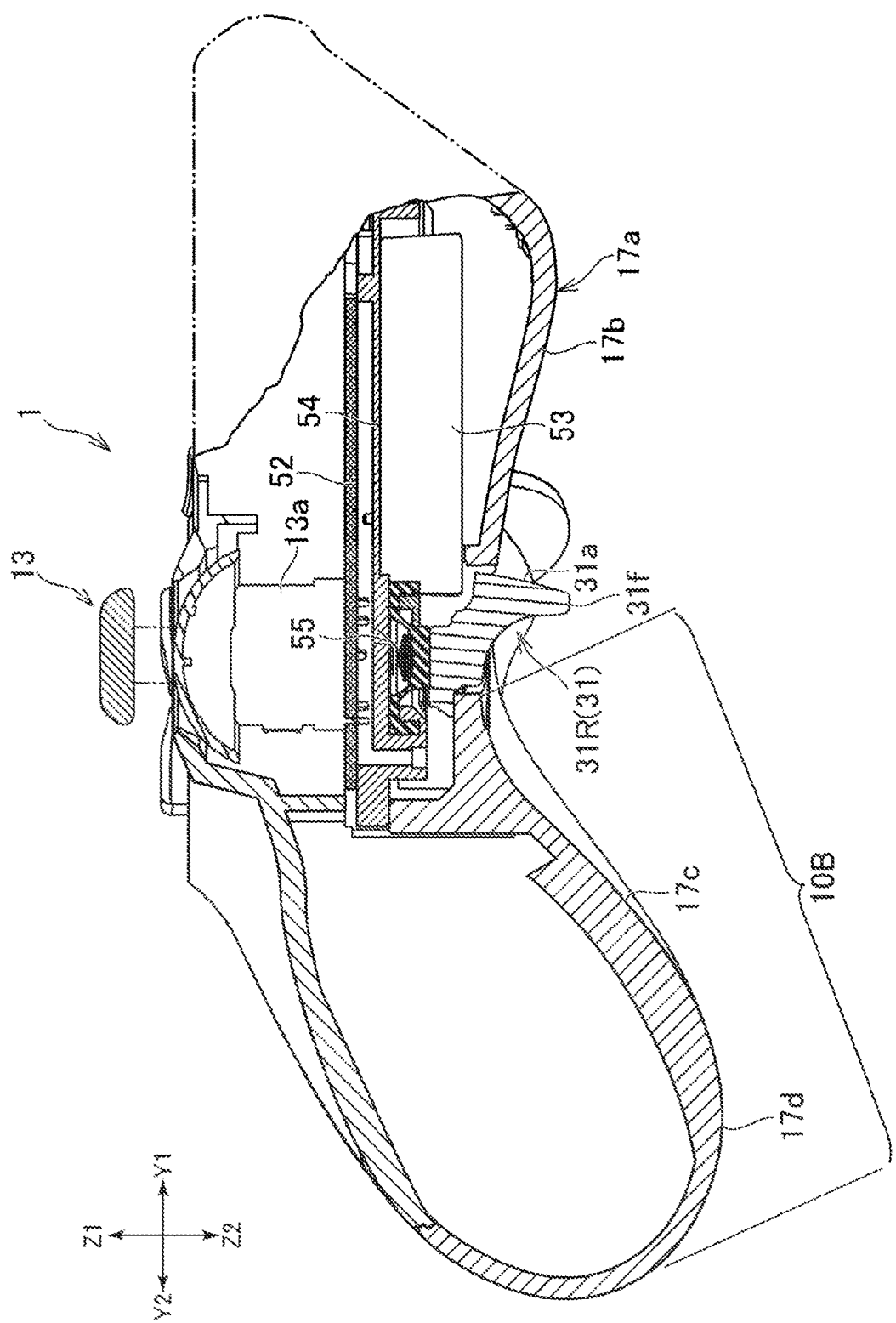
FIG. 3 is a sectional view taken along a line III-III illustrated in FIG. 2.

As illustrated in FIG. 3, the lower surface button 31 projects downward from the lower surface 17a of the input device 1 (lower surface of the housing 17). The lower surface button 31 has a pressing target surface 31a to be pressed by a finger of a user on the front side of the lower surface button 31. In the example of the input device 1, the pressing target surface 31a has an angle θ1 substantially perpendicular to the lower surface 17a. The angle θ1 (see FIG. 4) may be larger than 90 degrees, or may be smaller than 90 degrees.

The lower surface button 31 moves when the pressing target surface 31a is pressed by a finger in a direction D1 (see FIG. 4) along the lower surface 17a. In other words, as viewed from the lower surface of the input device 1, the lower surface button 31 moves in the direction D1 along the lower surface 17a. As will be described later, the lower surface button 31 is supported via supporting shaft portions 32 (see FIG. 5), and moves along an arc with an axis Ax1 (see FIG. 4) of the supporting shaft portions 32 as a center of the arc.

The existence of such a lower surface button 31 enables more various operations than conventional. It becomes possible, for example, to operate the lower surface button 31 with a middle finger while operating an operating member disposed on an upper surface 17g of the input device 1 (operating stick 13, for example) with a thumb or while operating an operating member disposed on the front surface of the input device 1 (operating button 14 or 15, for example) with an index finger. As a result, operability of an operation target (a game character, for example) in the game can be improved.

[Orientation of Lower Surface Button]

As illustrated in FIG. 2, the pressing target surface 31a is oriented in a direction inclined with respect to both the left-right direction and the front-rear direction of the input device 1, and the lower surface button 31 moves in a direction inclined with respect to both the left-right direction and the front-rear direction. Specifically, the pressing target surface 31a of the lower surface button 31 operated by a right hand (lower surface button 31R on the right side) is oriented obliquely forward and leftward as viewed from the lower surface of the input device 1. That is, a straight line perpendicular to the pressing target surface 31a extends obliquely forward and leftward as viewed from the lower surface of the input device 1. Then, when the pressing target surface 31a is pressed by a finger, the lower surface button 31R on the right side moves obliquely rearward and rightward as viewed from the lower surface of the input device 1. Similarly, the pressing target surface 31a of the lower surface button 31 operated by a left hand (operating button 31L on the left side) is oriented obliquely forward and rightward as viewed from the lower surface of the input device 1. Then, when the pressing target surface 31a is pressed by a finger, the lower surface button 31L on the left side moves obliquely rearward and leftward as viewed from the lower surface of the input device 1. In the following description, the direction in which the pressing target surface 31a faces (direction D2 in FIG. 4) will be referred to as a "button forward direction," and the direction in which the lower surface button 31 is pressed and moved (direction D1 in FIG. 4) will be referred to as a "button rearward direction."

As illustrated in FIG. 2, the input device 1 has a front edge 10a along the left-right direction and a rear edge 10b along the left-right direction. In the example of the input device 1, the front edge 10a and the rear edge 10b are edges provided to the central portion 10E located between the right portion 10R and the left portion 10L of the input device 1. As viewed from the lower surface of the input device 1, the pressing target surface 31a is inclined with respect to the front edge 10a. In addition, the pressing target surface 31a is also inclined with respect to the rear edge 10b. Further, the pressing target surface 31a is also inclined with respect to the center line C1 of the input device 1 (line passing through a center in the left-right direction and along the front-rear direction). Specifically, a distance between the pressing target surface 31a of the lower surface button 31R on the right side and the front edge 10a is increased toward the center line C1 of the input device 1. Similarly, a distance between the pressing target surface 31a of the lower surface button 31L on the left side and the front edge 10a is increased toward the center line C1 of the input device 1.

Due to such an inclined disposition of the lower surface button 31, movement of the pressing target surface 31a matches movement of a finger (a middle finger, for example) that operates the lower surface button 31. Thus, the user can operate the lower surface button 31 easily. The lower surface button 31 can move toward the grip portion 10B in the direction inclined with respect to both the left-right direction and the front-rear direction as viewed from the lower surface of the input device 1.

As described above, the operating buttons 14 and 15 (see FIG. 1) are provided to the front surface of the input device 1. The operating buttons 14 and 15 are located forward of the lower surface button 31. Unlike the pressing target surfaces 31a of the lower surface buttons 31R and 31L, pressing target surfaces (front surfaces) of the operating buttons 14 and 15 face straight forward.

[Position of Lower Surface Button]

As described above, the input device 1 has the lower surface button 31R disposed on the right side with respect to the center line C1 and the lower surface button 31L disposed on the left side with respect to the center line C1. As illustrated in FIG. 2, the lower surface buttons 31R and 31L are arranged so as to be symmetric with respect to the center line C1. More specifically, the pressing target surfaces 31a of the two lower surface buttons 31R and 31L face inward as viewed from the lower surface of the input device 1. That is, straight lines perpendicular to the pressing target surfaces 31a extend toward the center line C1. This arrangement of the lower surface buttons 31R and 31L enables the user to operate the two lower surface buttons 31R and 31L with, for example, the middle finger of the right hand and the middle finger of the left hand, respectively.

As described above, a plurality of operating members are arranged on the upper surface 17g of the input device 1. In the example of the input device 1, as illustrated in FIG. 1, the operating sticks 13, the operating buttons 11, and the direction keys 12 are arranged. These operating members are operating members for operating an operation target (a game character, for example) during execution of the game. Each of the left and right lower surface buttons 31R and 31L is located on an opposite side from these operating members in the upward-downward direction. Specifically, as illustrated in FIG. 3, the lower surface button 31R on the right side is located on an opposite side from the operating stick 13 on the right side, and the lower surface button 31L on the left side is located on an opposite side from the operating stick 13 on the left side. More specifically, the lower surface button 31R on the right side is located below a supporting mechanism 13a located at a base portion of the operating stick 13 on the right side. Similarly, the lower surface button 31L on the left side is located below a supporting mechanism 13a located at a base portion of the operating stick 13 on the left side. This arrangement of the lower surface buttons 31R and 31L can improve stability of retention of the input device 1 by the user.

Positional relation between the lower surface buttons 31R and 31L and the other operating members is not limited to that of the example of the input device 1. For example, on the upper surface 17g of the input device 1, the operating sticks 13 may be arranged forward of the operating buttons 11 and the direction keys 12. In this case, the lower surface button 31R on the right side may, for example, be located below the operating buttons 11. Similarly, the lower surface button 31L on the left side may be located below the direction keys 12.

[Positional Relation Between Lower Surface Buttons and Grip Portions]

As illustrated in FIG. 2, the lower surface button 31R on the right side and the lower surface button 31L on the left side are arranged on the inside of the left and right grip portions 10B. In other words, the lower surface buttons 31R and 31L are separated from the left and right grip portions 10B toward the center line C1. In the example of the input device 1, the lower surface buttons 31R and 31L are offset to the center line C1 side with respect to a straight line L2 passing through a side surface of the inside of the grip portion 10B as viewed from the lower surface of the input device 1. This arrangement of the lower surface buttons 31R and 31L facilitates gripping of the grip portions 10B when the lower surface buttons 31R and 31L are operated by the middle fingers, for example, because the lower surface buttons 31R and 31L are separated from the left and right grip portions 10B.

As illustrated in FIG. 2, the grip portion 10B is also inclined with respect to the center line C1. That is, an extending direction D3 of the grip portion 10B (direction along the side surface of the grip portion 10B) is inclined with respect to the center line C1. The pressing target surface 31a of the lower surface button 31 is inclined more greatly than the grip portion 10B. That is, an angle θ2 formed between the straight line perpendicular to the pressing target surface 31a and the center line C1 (see FIG. 2) is larger than an angle formed between the extending direction D3 of the grip portion 10B and the center line C1.

The arrangement of the lower surface buttons 31R and 31L is not limited to that of the example of the input device 1. For example, the two lower surface buttons 31R and 31L may not be arranged so as to be bilaterally symmetric. For example, one lower surface button may be located forward of the other lower surface button. In this case, the inclinations of the pressing target surfaces 31a of the two lower surface buttons do not have to be the same. In addition, the input device may be of a type operated by one hand. In this case, only one lower surface button may be provided to the lower surface of the input device.

[Inclination of Lower Surface and Position of Lower Surface Button]

Figure 4:
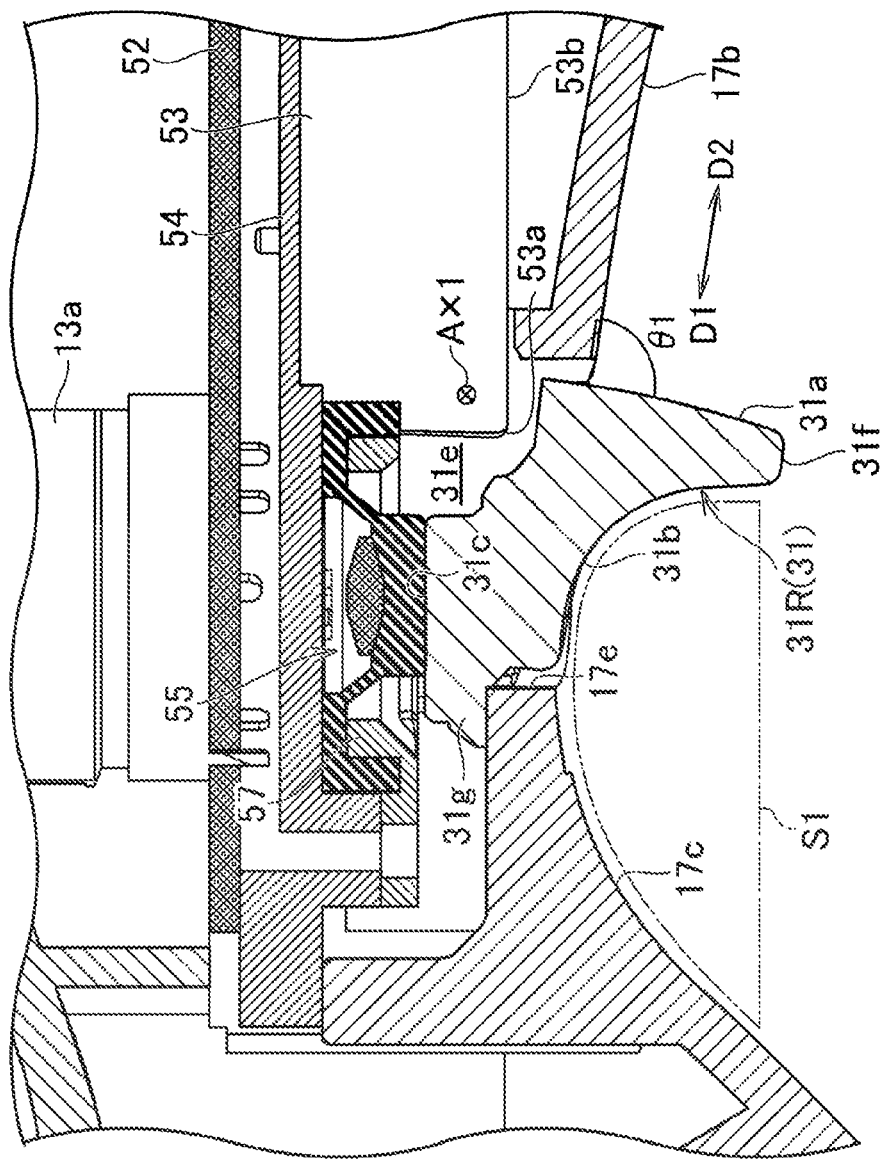
FIG. 4 is an enlarged view of FIG. 3.

As illustrated in FIG. 4, a space S1 is formed in the button rearward direction (direction D1) of the lower surface button 31. The lower surface button 31 therefore has an exposed surface 31b on an opposite side from the pressing target surface 31a, the exposed surface 31b being exposed from the housing 17. The user can place a finger to be used at the time of operation of the lower surface button 31 (the middle finger, for example) in the space S1 when the user does not use the lower surface button 31. This can prevent the middle finger from pressing the lower surface button 31 when an operation of the lower surface button 31 is not intended.

As illustrated in FIG. 3, lower surfaces 17c of rear portions of the right portion 10R and the left portion 10L (grip portion 10B) obliquely extend rearward and downward. In the example of the input device 1, the whole of the grip portion 10B is inclined downward with respect to the upper surface 17g (see FIG. 1) provided with the operating buttons 11, the direction keys 12, or the like. A lowermost portion 17d of the lower surface 17c of the grip portion 10B is located below a lower end 31f of the lower surface button 31. As illustrated in FIG. 4, the lower surface 17c of the grip portion 10B is separated from the rear surface of the lower surface button 31 (exposed surface 31b) in the button rearward direction, and the space S1 is formed between the exposed surface 31b of the lower surface button 31 and the lower surface 17c of the grip portion 10B as viewed in section of the input device 1. This structure enables the user to grip the grip portion 10B with, for example, the middle finger when the middle finger is disposed on the rear side of the lower surface button 31.

As illustrated in FIG. 4, the lower surface 17c of the grip portion 10B extends downward while curving from an edge 17e of an opening in which the lower surface button 31 is disposed (opening formed in the housing 17). In addition, the exposed surface 31b of the lower surface button 31 also curves. Specifically, the exposed surface 31b extends while curving forward and downward. The curving of the lower surface 17c and the curving of the exposed surface 31b can secure the sufficient space S1.

As illustrated in FIG. 3, the lower surface button 31 is separated rearward from a front edge of the lower surface 17a of the input device 1. Therefore, a front portion of the lower surface 17a is located in the button forward direction (direction indicated by D2 (FIG. 4)) with respect to the lower surface button 31. In other words, a front portion of the input device 1 (more specifically, the central portion 10E) has a lower surface 17b located in the button forward direction (direction indicated by D2 (FIG. 4)) with respect to the lower surface button 31. The existence of the lower surface 17b enables the user to press the pressing target surface 31a by moving the middle finger along the lower surface 17b.

As illustrated in FIG. 3, the lower surface 17b of the central portion 10E extends obliquely forward and downward from the position of the lower surface button 31. As described above, the lower surface 17c of the grip portion 10B extends obliquely rearward and downward from the position of the lower surface button 31. The lower surface button 31 is located between the lower surface 17c of the grip portion 10B and the lower surface 17b of the central portion 10E. In other words, the lower surface button 31 is located at an uppermost portion of the lower surface 17c of the grip portion 10B as viewed in section along the moving direction of the lower surface button 31 (that is, in section of FIG. 3). This disposition of the lower surface button 31 facilitates operation of the lower surface button 31 in a state of gripping the grip portion 10B.

As described above, the lowermost portion 17d of the lower surface 17c of the grip portion 10B is located below the lower end 31f of the lower surface button 31 (see FIG. 3). The input device 1 also has a part located below the lower end 31f of the lower surface button 31 in the front portion of the input device 1. For example, a lower end 15a (see FIG. 7) of the operating button 15 provided to the front surface of the input device 1 is located below the lower end 31f of the lower surface button 31. Therefore, when the input device 1 is placed on a horizontal surface H1 (see FIG. 7), the input device 1 is supported by the lower surface 17c and the lower end 15a of the operating button 15, and the horizontal surface H1 does not touch the lower surface button 31. As a result, an external force can be inhibited from acting on the lower surface button 31 during non-use of the input device 1.

Incidentally, it may not be the operating button 15 that touches the horizontal surface H1 when the input device 1 is placed on the horizontal surface H1. For example, a part located below the lower end 31f of the lower surface button 31 may be formed in the front portion of the housing 17.

[Lower Surface Button Supporting Structure]

Figure 5:
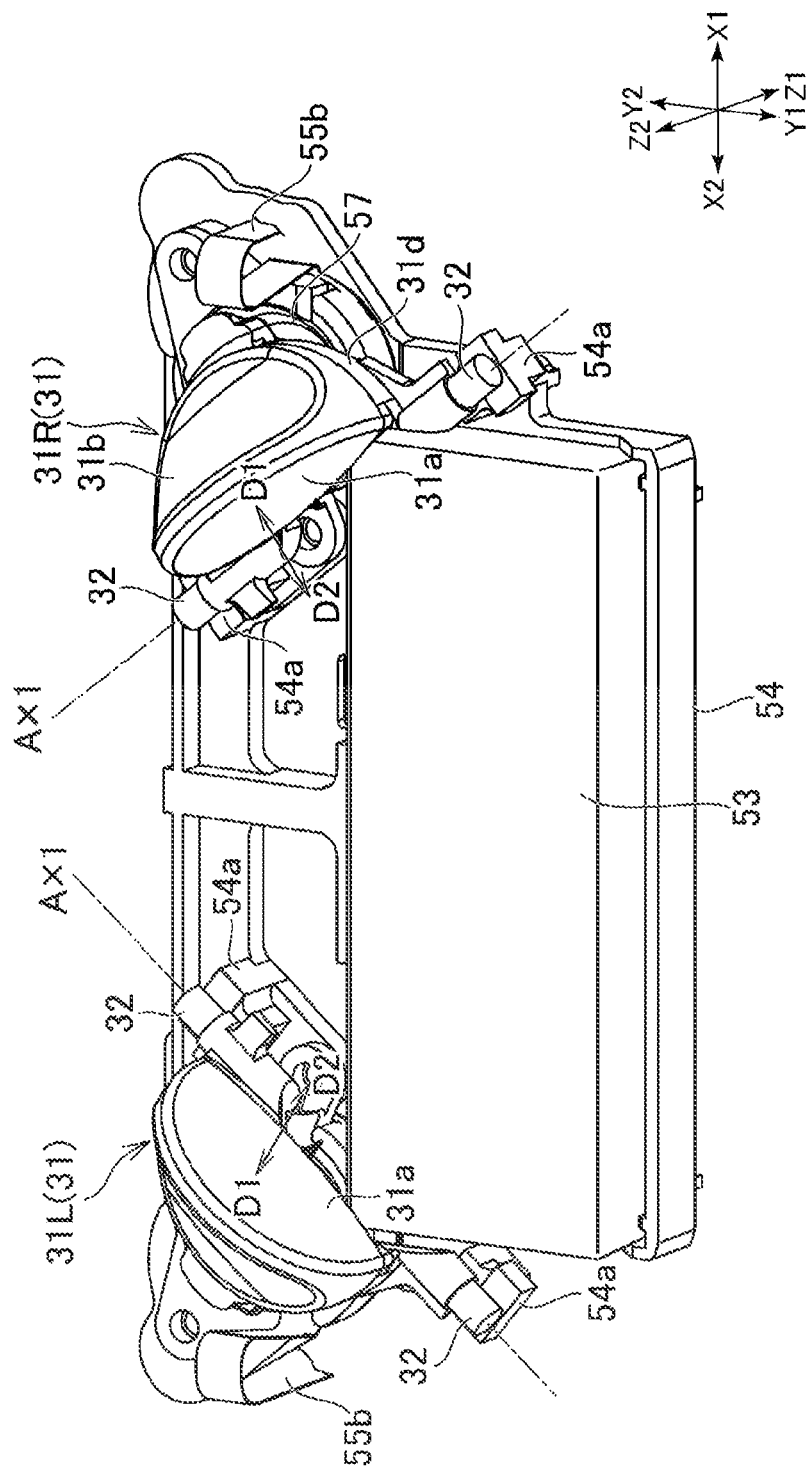
FIG. 5 is a perspective view of a battery, a battery holder holding the battery, and lower surface buttons (operating buttons).

As illustrated in FIG. 5, the lower surface button 31 has supporting shaft portions 32 in a base portion 31d thereof. The supporting shaft portions 32 are located inside the housing 17, and are retained so as to be rotatable. The lower surface button 31 can therefore move along an arc having the axis Ax1 of the supporting shaft portions 32 as a center. This can simplify the supporting structure of the lower surface button 31. In the example of the input device 1, the supporting shaft portions 32 project from side portions of the base portion 31d of the lower surface button 31. The input device 1 has stage portions 54a that support the supporting shaft portions 32. The stage portions 54a are, for example, formed on a battery holder 54 that holds a battery 53. The supporting shaft portions 32 are sandwiched in the upward-downward direction by holding portions (not illustrated) formed on an inner surface of the housing 17 and the stage portions 54a, and are rotatable between the holding portions and the stage portions 54a.

The moving direction of the lower surface button 31 (direction D1-D2 in FIG. 5) is perpendicular to the axis Ax1 of the supporting shaft portions 32. In the example of the input device 1, the axis Ax1 of the supporting shaft portions 32 is inclined with respect to both the front-rear direction and the left-right direction of the input device 1. In other words, the axis Ax1 of the supporting shaft portions 32 is inclined with respect to the front edge 10a that is along the left-right direction. In addition, the axis Ax1 of the supporting shaft portions 32 is inclined with respect to the rear edge 10b that is along the left-right direction. Due to such an inclination of the axis Ax1, movement of the pressing target surface 31a matches movement of a finger operating the lower surface button 31 (the middle finger, for example). The user can therefore operate the lower surface button 31 easily. In the example of the input device 1, the axis Ax1 of the supporting shaft portions 32 of the lower surface button 31R on the right side extends forward and rightward, and the axis Ax1 of the supporting shaft portions 32 of the lower surface button 31L on the left side extends forward and leftward. Hence, the axis Ax1 of the supporting shaft portions 32 of the lower surface button 31R on the right side and the axis Ax1 of the supporting shaft portions 32 of the lower surface button 31L on the left side are inclined such that a distance therebetween increases toward the front.

It is to be noted that the supporting structure of the lower surface button 31 is not limited to that of the example of the input device 1. For example, the supporting shaft portions 32 may be held by members different from the housing 17 and the battery holder 54. In yet another example, the supporting shaft portions (projecting portions) may be formed on a main body of the input device 1 which main body supports the lower surface button 31 rather than in the lower surface button 31. For example, the supporting shaft portions may be formed on the battery holder 54 or the housing 17. In this case, holding portions as recessed portions or holes into which the supporting shaft portions are fitted may be formed in the lower surface button 31. In yet another example, the lower surface button 31 may be slidable in the direction D1-D2 rather than moving along the arc having the supporting shaft portions as a center. In this case, the input device 1 may have a guide that guides the movement of the lower surface button 31, and this guide may extend in a direction inclined with respect to both the front-rear direction and the left-right direction.

[Structure for Pressing Sensor]

As illustrated in FIG. 4, the pressing target surface 31a of the lower surface button 31 is located below the axis Ax1 of the supporting shaft portions 32, and projects downward from the lower surface 17a of the housing 17. The lower surface button 31 has a pressing surface 31c. The pressing surface 31c is located within the housing 17, and is separated from the axis Ax1 of the supporting shaft portions 32 in the button rearward direction (direction D1). The pressing surface 31c faces upward. In other words, the pressing surface 31c faces the circuit board 52 in the upward-downward direction.

As illustrated in FIG. 4, a sensor 55 for detecting movement of the lower surface button 31 is disposed within the housing 17. The sensor 55 is, for example, a sensor that outputs a signal corresponding to an amount of movement or a pressing force of the lower surface button 31 (a pressure sensitive sensor, for example). In this case, an information processing device such as a game machine may perform processing corresponding to the detected movement amount or the detected pressing force. In another example, a sensor that outputs a signal corresponding to the movement amount or the pressing force may be used as the sensor 55, and an operation (on-off) of the lower surface button 31 may be detected according to whether or not the amount of movement or the pressing force is larger than a threshold value. In yet another example, a switch that outputs an on/off signal may be disposed as the sensor 55 in place of the sensor that outputs a signal corresponding to the movement amount or the pressing force of the lower surface button 31. The sensor 55 is located above the pressing surface 31c, and the pressing surface 31c and the sensor 55 face each other in the upward-downward direction. When the pressing target surface 31a of the lower surface button 31 is pressed in a direction along the lower surface 17b (direction D1), the lower surface button 31 moves about the axis Ax1, and the pressing surface 31c presses the sensor 55 upward.

The above-described supporting structure of the lower surface button 31 can convert a force pressing the lower surface button 31 (force in the direction D1) into a force pressing the sensor 55 (force directed upward). In addition, both the position of the pressing target surface 31a to be pressed by a finger of the user and the position of the sensor 55 can be made appropriate by adjusting a distance from the pressing target surface 31a to the pressing surface 31c.

As illustrated in FIG. 4, in the example of the input device 1, the pressing surface 31c is in contact with the sensor 55 when the lower surface button 31 is at an initial position (position illustrated in FIG. 4). In addition, when the lower surface button 31 is at the initial position, an end portion 31g of the lower surface button 31 is located on an upper side of the edge 17e of the opening formed in the housing 17. As a result of this, the lower surface button 31 is retained at the initial position. When a force pressing the lower surface button 31 is released after the lower surface button 31 is pressed by the user, the lower surface button 31 is returned to the initial position by the force of an elastic member included in the sensor 55, for example. The input device 1 may have a dedicated elastic member (a spring or a rubber, for example) for returning the lower surface button 31 to the initial position.

[Positional Relation Between Battery and Lower Surface Button]

Figure 6:
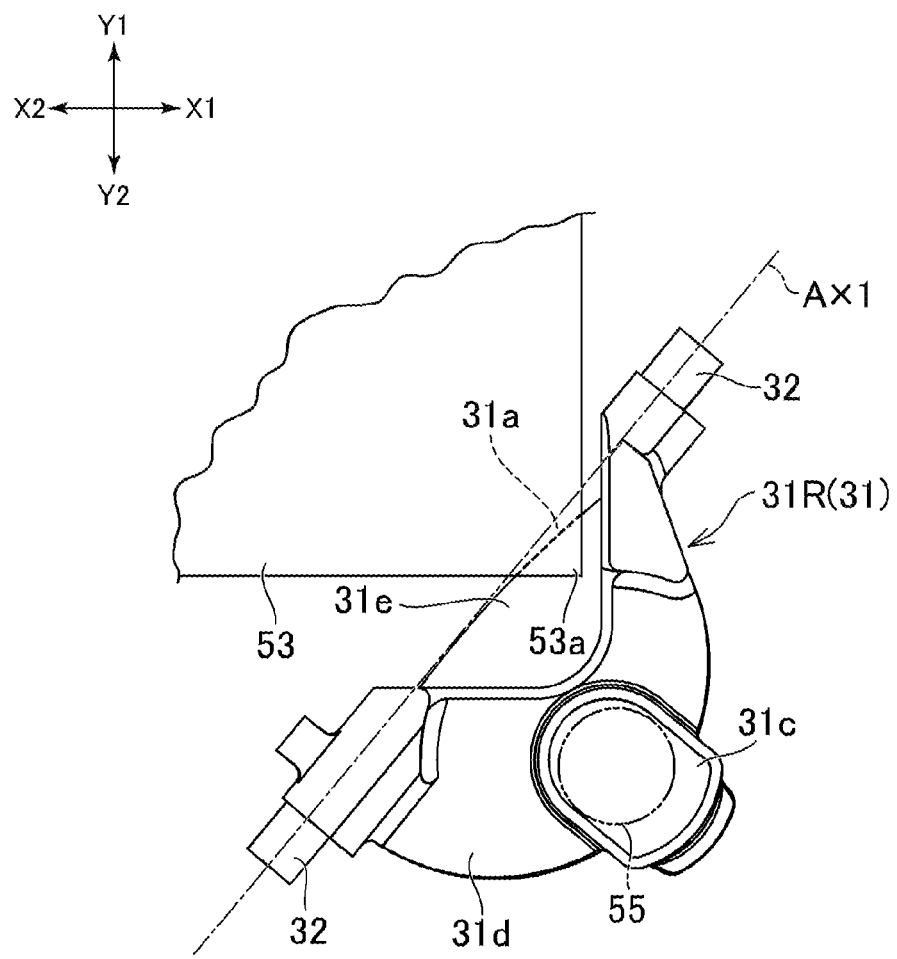
FIG. 6 is a plan view illustrating relative positional relation between the battery and a lower surface button (operating button), the plan view illustrating a corner of the battery and a pressing target surface of the lower surface button which pressing target surface is located below the corner of the battery.

The input device 1 includes the circuit board 52 (see FIG. 3) and the battery 53 (see FIG. 3) that stores electricity to be supplied to various parts included in the input device 1. As illustrated in FIG. 4, the pressing target surface 31a of the lower surface button 31 is located below the battery 53. In other words, as illustrated in FIG. 6, as viewed in plan of the battery 53 and the operating button 31, a corner portion 53a of the battery 53 and the pressing target surface 31a overlap each other. With the arrangement of the battery 53 and the operating button 31, the position of the pressing target surface 31a can be made appropriate while a size of the battery 53 is secured.

As illustrated in FIG. 4, the pressing surface 31c of the lower surface button 31 is separated from the pressing target surface 31a in the radial direction of the supporting shaft portions 32, or in other words, in the button rearward direction (the direction D1, or a direction along the circuit board 52), and is formed at a position beyond the corner portion 53a of the battery 53. The sensor 55 is located at a position higher than a lower surface 53b of the battery 53. In addition, the pressing surface 31c is also formed at a position higher than the lower surface 53b of the battery 53.

As illustrated in FIG. 3, in the example of the input device 1, a plate-shaped battery holder 54 is disposed on a lower side of the circuit board 52. The battery 53 is further disposed on the lower side of the battery holder 54, and is held by the battery holder 54. Hence, as illustrated in FIG. 4, the corner portion 53a of the battery 53 is located between the pressing target surface 31a of the lower surface button 31 and the circuit board 52.

In addition, in the example of the input device 1, as illustrated in FIG. 4, the sensor 55 is attached to the battery holder 54, and is separated downward from the circuit board 52. The sensor 55 and the circuit board 52 are connected to each other via an electric cable 55b (a flexible flat cable, for example) illustrated in FIG. 5. Such a supporting structure of the sensor 55 can reduce a distance between the sensor 55 and the operating button 31 as compared with a structure in which the sensor 55 is, for example, directly mounted on the circuit board 52. The sensor 55 may be directly mounted on the circuit board 52 unlike the example of the input device 1. The sensor 55 is attached by an attaching member 57 (see FIG. 4) to a lower surface of the battery holder 54.

As described above, the two supporting shaft portions 32 are formed in the lower surface button 31. As illustrated in FIG. 6, the corner portion 53a of the battery 53 is located between the two supporting shaft portions 32. Specifically, a recessed portion 31e is formed in the base portion 31d of the lower surface button 31. The recessed portion 31e opens upward and in the button forward direction (direction D2 in FIG. 4). That is, the recessed portion 31e opens toward the battery 53. The two supporting shaft portion 32 of the lower surface button 31 are formed on sides opposite from each other with the recessed portion 31e interposed therebetween. The corner portion 53a of the battery 53 is included in the recessed portion 31e.

The axis Ax1 of the supporting shaft portions 32 intersects the corner portion 53a of the battery 53 (see FIG. 4). According to the positional relation between the axis Ax1 and the battery 53, the position of the axis Ax1 is raised as compared with a case where the axis Ax1 is located below the battery 53, for example. As a result, a distance between the pressing target surface 31a and the axis Ax1 can be increased, so that a moment occurring in the lower surface button 31 when the user presses the lower surface button 31 can be increased.

SUMMARY

As described above, the lower surface buttons 31R and 31L are arranged in the lower surface 17a of the input device 1. The lower surface buttons 31R and 31L project downward from the lower surface 17a. The lower surface buttons 31R and 31L have the pressing target surfaces 31a to be pressed by a finger of the user. The pressing target surfaces 31a are disposed so as to be inclined with respect to the front edge 10a of the input device 1. The lower surface buttons 31R and 31L can be moved when the pressing target surfaces 31a are pressed in the button rearward direction as a direction along the lower surface 17a. With the input device 1, more various operations than conventional become possible. In addition, with the input device 1, the orientations of the pressing target surfaces 31a can be matched with movement of fingers of the user. As a result, the user can operate the lower surface buttons 31R and 31L smoothly.

In addition, the space S1 is formed in the button rearward direction with respect to the lower surface buttons 31R and 31L. With the space S1, the user can place a finger used at the time of operation of the lower surface button 31 (the middle finger, for example) in the space S1 when the user does not use the lower surface button 31. This can prevent the middle finger from pressing the lower surface button 31 when an operation of the lower surface button 31 is not intended.

[Modifications]

The input device proposed in the present disclosure is not limited to the input device 1 described above.

For example, the part located above the pressing target surface 31a of the lower surface button 31 (in other words, the part disposed in the recessed portion 31e) may not be the battery 53. Specifically, a part such as an integrated circuit (IC) chip mounted on the circuit board 52 may be located above the pressing target surface 31a. In this case, the positions of both the pressing target surface 31a and the IC chip can be optimized by forming the pressing surface 31c at a position beyond the IC chip. As another example, the recessed portion 31e may not be formed in the lower surface button 31. In this case, the axis Ax1 of the supporting shaft portions 32 may not intersect the battery 53. For example, the axis Ax1 may be located below the corner portion 53a of the battery 53, or may be separated from the corner portion 53a of the battery 53 in a horizontal direction (direction along the circuit board 52).

The invention claimed is:

1. An input device comprising:
a first operating member disposed in an upper surface; and
a second operating member disposed in a lower surface;

the second operating member projecting downward from the lower surface, having a pressing target surface to be pressed by a finger of a user, being disposed such that the pressing target surface is inclined with respect to an extending direction of a front edge of the input device, and being capable of being moved when the pressing target surface is pressed in a first direction as a direction along the lower surface, wherein the pressing target surface is inclined with respect to the extending direction of the front edge of the input device is defined as follows:

the front edge of the input device defines a plane, a center line extending in a normal direction to the plane in a front-rear direction, and a left-right direction that is perpendicular to the center line, and the pressing target surface is oriented in a direction inclined with respect to both the left-right direction and the front-rear direction.

2. The input device according to claim 1, wherein a space is formed in the first direction with respect to the second operating member.

3. The input device according to claim 1, wherein the second operating member includes a second operating member on a right side and a second operating member on a left side.

4. The input device according to claim 3, wherein the second operating member on the right side and the second operating member on the left side are arranged symmetrically with respect to the center line.

5. The input device according to claim 1, further comprising:
a grip portion having a lower surface constituting a part of the lower surface, wherein
the lower surface of the grip portion is located in the first direction with respect to the second operating member and bulges downward, and
a space is formed between the lower surface of the grip portion and the second operating member.

6. The input device according to claim 1, wherein
the second operating member includes a second operating member on a right side and a second operating member on a left side,
the input device includes a right grip portion located on the right side with respect to the center line and a left grip portion located on the left side with respect to the center line,
at least a part of the second operating member on the right side is located nearer to the center line than the right grip portion, and
at least a part of the second operating member on the left side is located nearer to the center line than the left grip portion.

7. The input device according to claim 6, wherein
the right grip portion has a side surface nearer to the center line,
the left grip portion has a side surface nearer to the center line,
the second operating member on the right side is disposed so as to be offset toward the center line from a straight line passing through the side surface of the right grip portion, and
the second operating member on the left side is disposed so as to be offset toward the center line from a straight line passing through the side surface of the left grip portion.

8. The input device according to claim 1, further comprising:
a front portion on which a plurality of the first operating members are arranged; and
a grip portion extending rearward and downward from the front portion, wherein
the second operating member is located between a lower surface of the front portion and a lower surface of the grip portion.

9. The input device according to claim 1, wherein
a plurality of the first operating members include an operating stick, a direction key, or four operating buttons arranged at end portions of a cross, and
the second operating member is located on an opposite side from the operating stick, the direction key, or the four operating buttons in an upward-downward direction.

10. The input device according to claim 1, further comprising:
a first part located forward of the second operating member and located below a lower end of the second operating member; and
a second part located rearward of the second operating member and located below the lower end of the second operating member.

11. The input device according to claim 1, wherein the second operating member is able to move along an arc having an axis of a supporting shaft portion supporting the second operating member as a center.

12. The input device according to claim 11, further comprising:
a sensor for detecting movement of the second operating member, wherein
the pressing target surface is located below the axis of the supporting shaft portion, and
the second operating member is separated from the axis of the supporting shaft portion in the first direction and has a pressing surface that presses the sensor.

13. The input device according to claim 11, further comprising:
a housing;
a sensor for detecting movement of the second operating member; and
a part disposed within the housing, wherein
the pressing target surface is located below the part,
the second operating member has a pressing surface for pressing the sensor, and
the pressing surface is separated in a radial direction of the supporting shaft portion from a position of the pressing target surface beyond the part.

* * * * *